United States Patent [19]
Furomoto et al.

[11] Patent Number: 5,350,129
[45] Date of Patent: Sep. 27, 1994

[54] SPINNING REEL HAVING BALANCING MEANS

[75] Inventors: Yoshiyuki Furomoto, Osaka; Osamu Yoshikawa; Kenichi Sugawara, both of Sakai, all of Japan

[73] Assignee: Shimano Inc., Osaka, Japan

[21] Appl. No.: 889,273

[22] Filed: May 28, 1992

[30] Foreign Application Priority Data

May 31, 1991 [JP] Japan .............................. 3-040086[U]
Nov. 19, 1991 [JP] Japan .............................. 3-094724[U]

[51] Int. Cl.⁵ ..................... A01K 89/01; A01K 89/027
[52] U.S. Cl. ..................... 242/231; 242/300; 242/311
[58] Field of Search ............... 242/230, 231, 232, 233, 242/300, 247, 311

[56] References Cited

U.S. PATENT DOCUMENTS

| | | | |
|---|---|---|---|
| 4,171,108 | 10/1979 | Ishida et al. | 242/231 |
| 4,202,508 | 5/1980 | Ishida et al. | 242/231 |
| 4,279,387 | 7/1992 | Morimoto . | |
| 4,427,162 | 1/1984 | Noda . | |
| 4,527,752 | 7/1985 | Maruyama et al. . | |
| 4,577,807 | 3/1986 | Urso | 242/230 |

FOREIGN PATENT DOCUMENTS 52-80887  6/1977  Japan .

Primary Examiner—Katherine Matecki
Attorney, Agent, or Firm—Dickstein, Shapiro & Morin

[57] ABSTRACT

A spinning reel includes a reel body, a rotor disposed at a forward position of the reel body, an arm cam pivotably attached to one of a pair of portions of the rotor and a pivotable arm pivotably attached to the other arm portion. A bail is interposed between a line roller of the arm cam and the pivotable arm. A balancer, which is provided to the pivotable arm, has a configuration projecting on a side opposite to the bail and outwardly of the pivotable arm with respect to a direction along a pivot axis of the pivotable arm.

4 Claims, 8 Drawing Sheets

SPINNING REEL HAVING BALANCING MEANS

BACKGROUND OF THE INVENTION

1. Field of the Invention

The present invention relates to a spinning reel having a balancing means, and more particularly to art for improving rotational balance of a rotor of a spinning reel including an arm cam pivotably attached to one of a pair of arm portions of the rotor provided at a forward position of a reel body, a pivotable arm provided to the other arm portion and a bail extending between a line roller formed on the arm cam and the pivotable arm.

2. Description of the Related Art

In general, in the case of a spinning reel having the above-described construction, for retrieving a fishing line, the fishing line is guided via a line guide portion (generally comprised of a rotary member commonly referred to as a line roller) to be wound about a spool. Further, in the case of the conventional spinning reel of this type, there occurs imbalance in rotation of the rotor due to the weights of such components as the arm cam, the line roller of the arm cam and so on. Then, in order to improve the rotational balance, a balancer is disposed e.g. inside the rotor at such a position as to offset the weights of the above components in a direction along a rotational axis of the rotor.

Now, considering the above arrangement where the balancer is disposed inside the rotor for instance, the arrangement is such that the weight balance is achieved in the direction along the rotational axis of the rotor. However, as shown in FIG. 11, with respect to a further direction normal to the rotational axis X of the rotor 4, a composite gravity center of the components including the arm cam 8, the line roller 10 and so on is located at a relatively forward position with respect to the rotor 4. As a result, there is produced a significant distance between a rotary path of the composite gravity center and a rotary path of a gravity center WT of the balancer 45. If a rotary operation is effected under this condition, there is produced a torque about a point where a straight line extending between the gravity centers WP and WT and the rotational axis X cross each other. Thus, in the case of a high-speed line retrieving operation, the rotor 4 will significantly vibrate and this vibration may be transmitted consequently to a top of a fishing rod, whereby the line retrieving operation can not be effected i n a smooth manner.

In particular, in the case of spinning reels of recent years, the composite gravity center of the components including the arm cam tends to be located at a forwardly displaced position with respect to the rotor, since the line roller is provided with a large diameter in order to reduce load during a line retrieving action or the arm cam is provided with a mechanism for allowing one-step release operation of the bail. In such case, the torque will have a larger value, thus a smooth line retrieving action even more difficult.

SUMMARY OF THE INVENTION

A primary object of the present invention is to provide an improved spinning reel which allows a smooth high-speed line retrieving action through an ingenious positioning arrangement of the balancer.

For accomplishing the above-noted object, a spinning reel, according to the present invention, comprises:

a reel body;

a rotor disposed at a forward position of the reel body;

an arm cam pivotably attached to one of a pair of arm portions of the rotor;

a pivotable arm pivotably attached to the other arm portion;

a bail interposed between a line roller of the arm cam and the pivotable arm; and a balancer provided to the pivotable arm, the balancer having a configuration projecting on a side opposite to the bail and outwardly of the pivotable arm with respect to a direction along a pivot axis of the pivotable arm.

Functions and effects of the above construction will be described next.

FIGS. 1 through 3 show a sample construction incorporating the above-described features of the invention. As shown, a composite gravity center WQ of the pivotable arm 9 and the balancer 11 and a center WP of the arm cam 8 are located substantially on a same path. Moreover, these gravity centers WQ, WP are positioned in opposition to each other, so that moments of these gravity centers WQ, WP are balanced with each other. Also, since the composite gravity center WQ of the pivotable arm 9 and the balancer 11 is located in opposition to the bail 3 across the rotational axis X (i.e. a weight of this gravity center WQ can offset, to some extent, a weight of the bail 3), there is produced e.g. no torque from the weight of the arm cam 8 during rotation of the rotor 4.

Incidentally, FIG. 1 illustrates moment values of the above-described balanced condition with respect to the rotational axis X. As shown, a moment value UP from the weight of the composite gravity center WP of the arm cam and so on and a further moment value Q from the weight of the composite gravity center WQ of the pivotable arm 9 and so on are balanced with each other.

In short, according to the present invention, the balancer 11 is formed with the pivotable arm 9. Thus, in comparison with the arrangement forming the balancer with the rotor 4 for instance, the balancer does not significantly project from the rotor 4, thus effectively restricting torque generation.

Consequently, through the ingenious arrangement of the balancer, the invention has fully achieved its intended object of providing an improved spinning reel which allows a smooth high-speed line retrieving action.

According to a further embodiment of the present invention, the spinning reel will be constructed to be described next.

According to this embodiment, like the foregoing construction, a spinning reel includes a bail pivotably interposed between a arm cam provided to one of a pair of arm portions of a rotor and pivotable arm provided to the other arm portion, wherein a balancer is formed with the pivotable arm and a composite gravity center of this balancer and of the pivotable arm is located as a position on or adjacent a rotational path along which the arm cam moves during rotation of the rotor with the composite gravity center being provided with such a weight as to offset a weight of a gravity center of the arm cam.

Functions and effects of this further construction will be described next.

FIG. 7 shows a sample construction incorporating these features. As shown, the composite gravity center WQ of the pivotable arm 9 and of the balancer 11 and the gravity center WP of the arm cam 8 are located on the same path and also these gravity centers WQ. WP are opposed to each other. As the results, the weights are balanced each other in the direction along the axis X and also the gravity centers WQ, WP are located on the same rotational path, whereby there is produced e.g. no torque during the rotation of the rotor 4.

That is to say, according to these features of the present invention, the balancer 11 is formed integrally with or separately from the pivotable arm 9. Accordingly, in comparison with the arrangement of forming the balancer with the rotor 4, for instance, the balancer 11 does not project from the rotor 4 and there is produced no torque.

Consequently, through the ingenious arrangement of the balancer, the invention has also achieved an improved spinning reel which allows a smooth line retrieving action at a high speed without causing such inconvenience as vibration on the fishing rod even if a mechanical looseness is developed in the construction.

Further, and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a spinning reel relating to the present invention; in which.

DESCRIPTION OF THE PREFERRED EMBODIMENTS

Preferred embodiments of a spinning reel according to the present invention will now be described in details with reference to the accompanying drawings.

Figure 4:
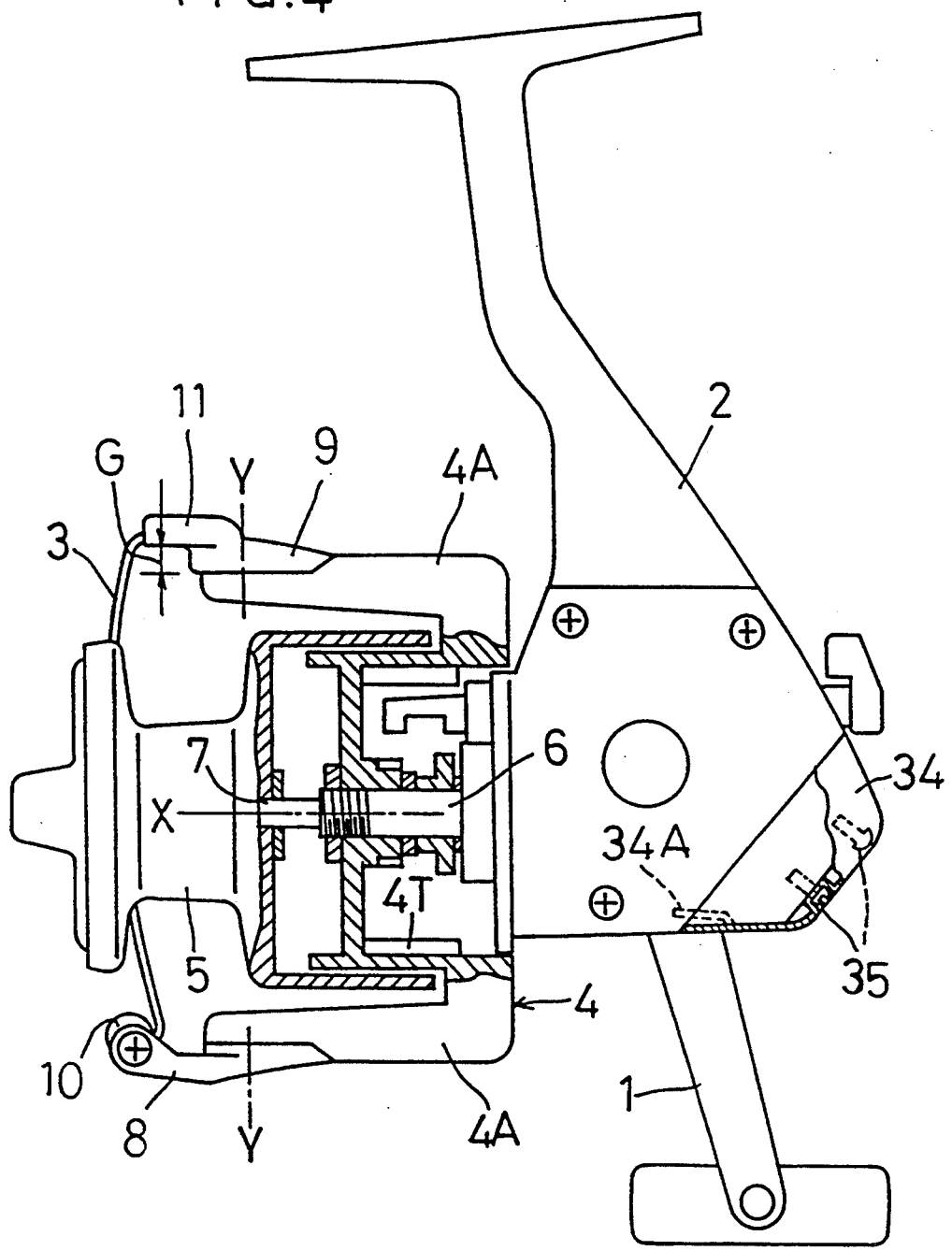
FIG. 4 is a partially cutaway side view of the tee 1.

FIG. 4 shows a spinning reel relating to a first embodiment of the invention. At forward positions of a reel body 2 having a handle 1, there are disposed a rotor or 4 having a bail 3 and a spool 5 for retrieving a fishing line. At further forward positions of the reel body 2, there are provided a cylinder shaft 6 for transmitting a force from the handle 1 to the rotor 4 and a spool shaft 7 for supporting the spool 5.

Figure 5:
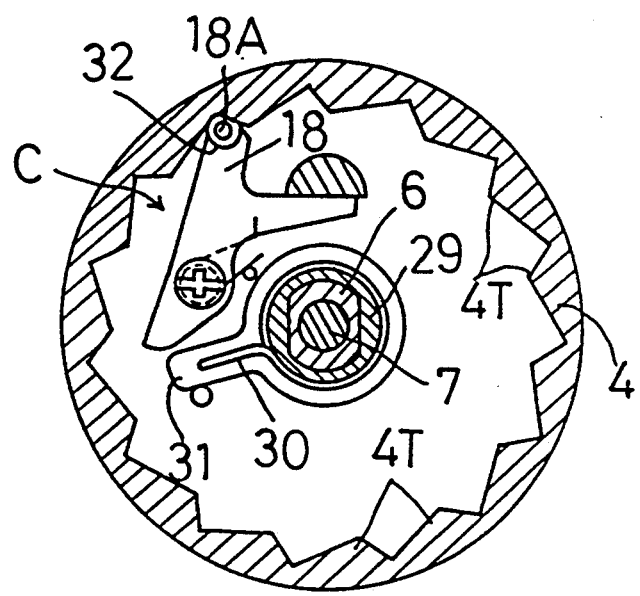
FIG. 5 is a front view of a one-way clutch mechanism.
Figure 6:
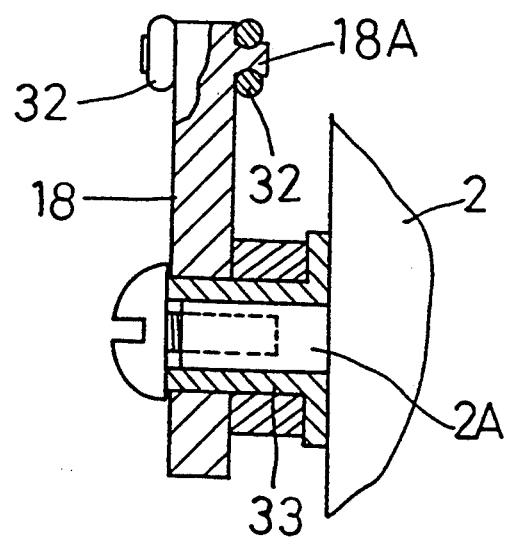
FIG. 6 is a section view of a support construction of a pawl member.
Figure 7:
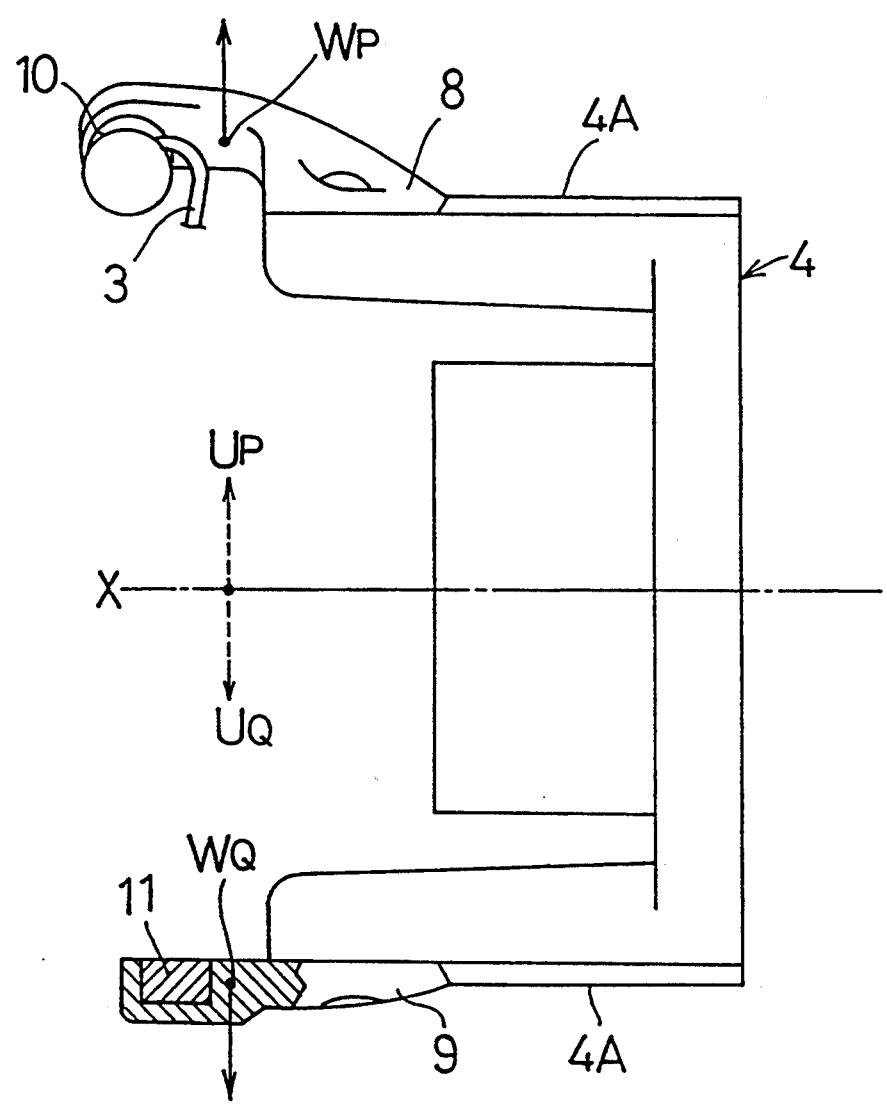
FIG. 7 is a side view showing an arrangement of a balancer of a spinning reel relating to a further embodiment of the present invention.
Figure 8:
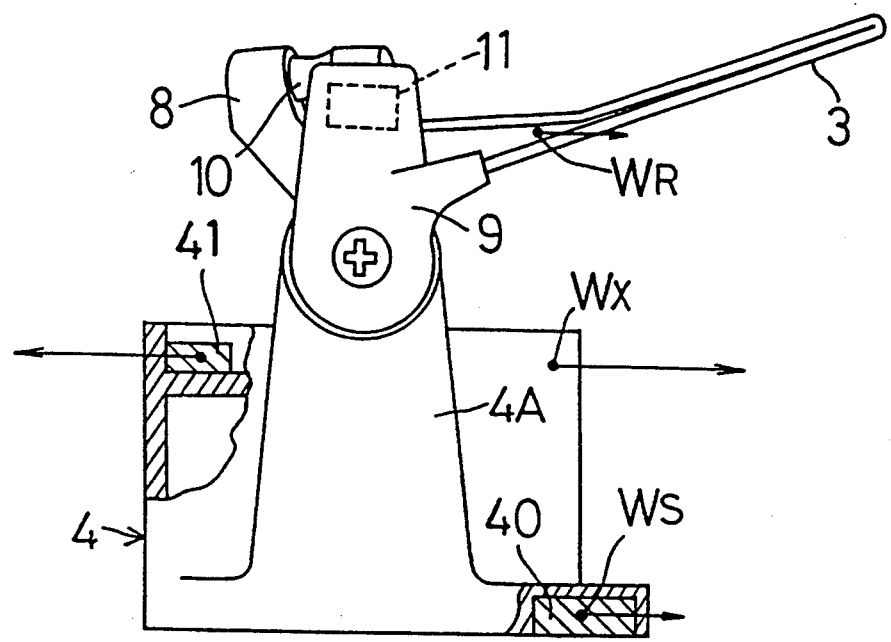
FIG. 8 is a side view of a rotor.
Figure 9:
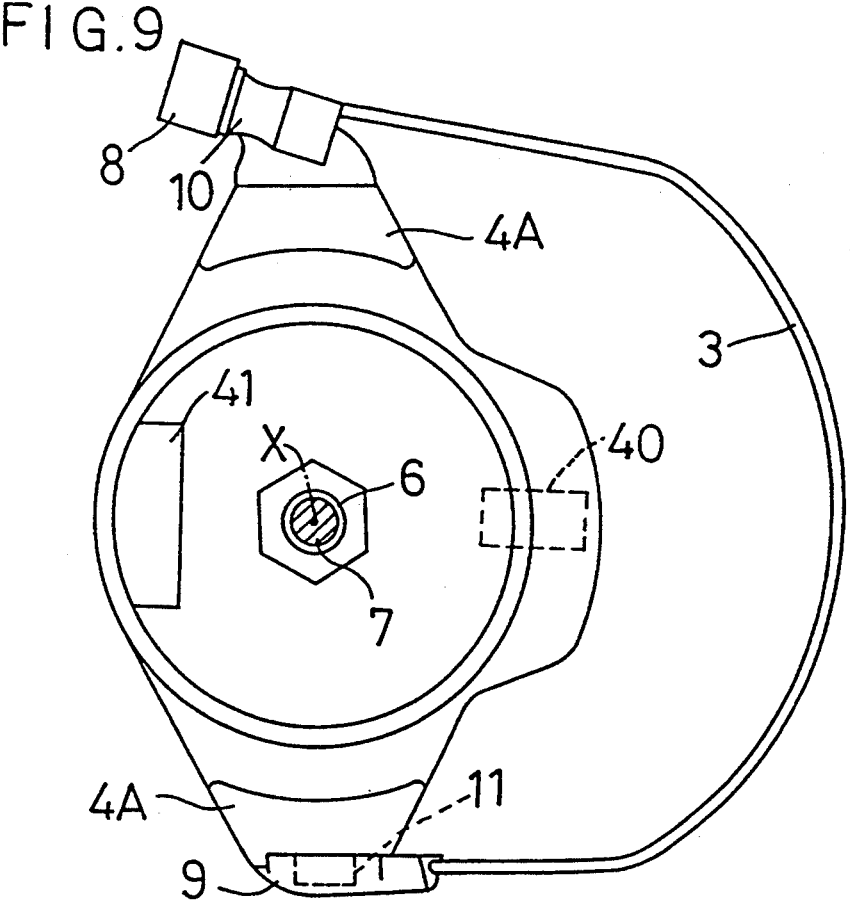
FIG. 9 is a front view of the rotor.
Figure 10:
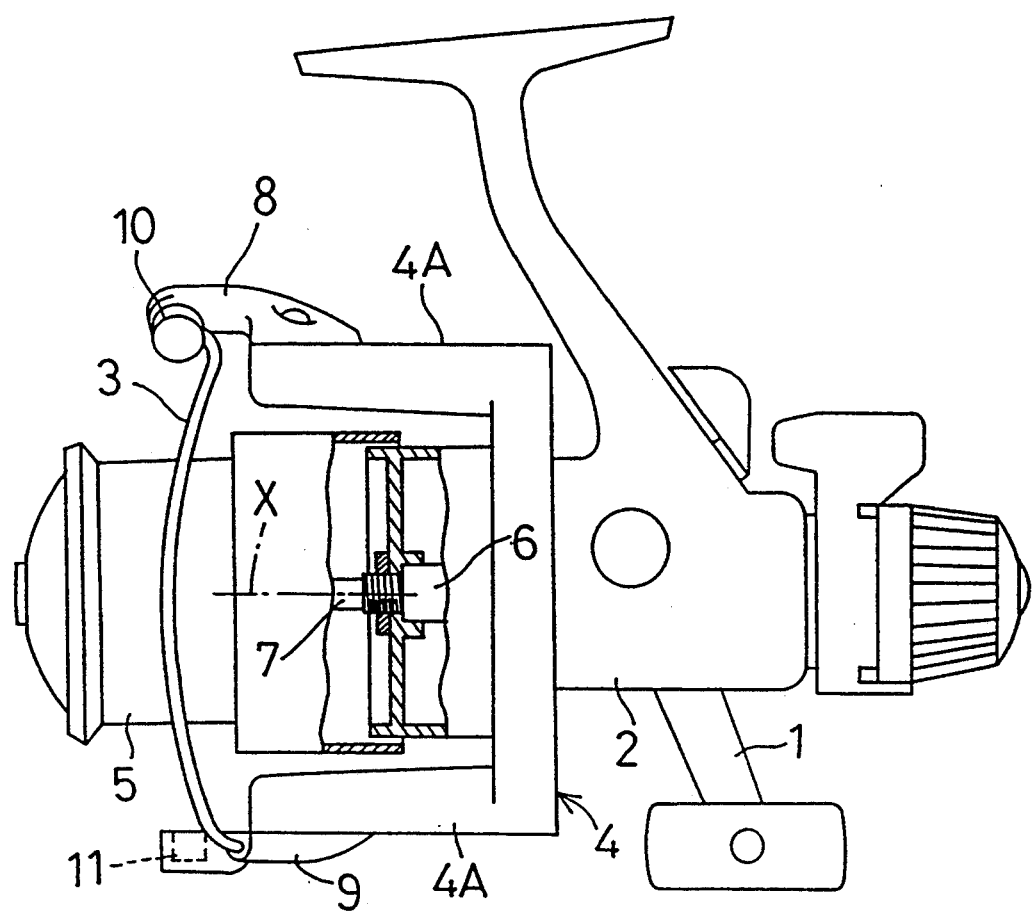
FIG. 10 is an overall side view of the spinning reel.
Figure 11:
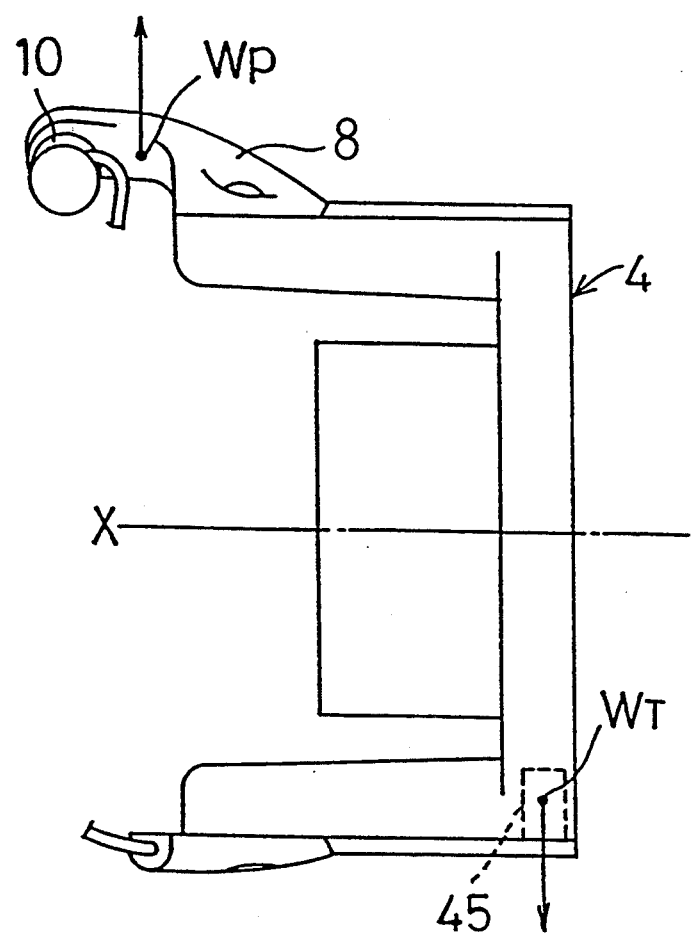
FIG. 11 is a side view showing a balancer arrangement of the prior art.

Further, in this reel, as shown in FIGS. 5 and 6, there is provided, inside the rotor 4, a one-way clutch C for preventing reverse rotation (rotation in a line feeding direction) of the rotor 4, This one-way clutch C includes a plurality of teeth 4T formed on an inner periphery of the rotor 4, a pawl member 18 engageable with and disengageable from the teeth 4T and a cam member 31 operable by a spring member 30 outwardly engaging a sleeve 29 rotatable in unison with the cylinder shaft 6 in order to control a posture of the pawl member 18. On a shaft portion 18A formed at a leading end of the pawl member 18, there is provided an O-ring 32 for reducing impact noise which is generated with the engagement between the member 18 and the teeth 4T.

The pawl member 18 is supported to a projecting shaft portion 2A of the reel body 2 via a bush 33 made of a resin material.

Further, as shown in FIG. 4 at a rear portion of the reel body 2, there is provided a guard member 34 made of stainless steel with a forward end portion 34A of the member 34 being engaged with the reel body 2 while a rear face thereof being fastened by means of a screw 35, so that the guard member 34 can reduce frictional wear at this portion of the reel body.

The rotor 4 includes a pair of arm portions 4A, 4A at positions opposed to each other across a rotational axis X. An arm cam 8 is attached to one arm portion 4A to be pivotable about a pivot axis Y. A pivotable arm 9 is attached to the other arm portion 4A to be pivotable about the pivot axis Y. Further, the bail 3 is attached between a line roller 10 acting as a line guide unit provided with the arm cam 8 and the pivotable arm 9, with the bail 3 being switchable between a line releasing position and a line retrieving position.

Moreover, in this reel, there is provided a balancing means for offsetting imbalance from weights of such components as the arm cam 8 and the line roller 10.

Figure 1:
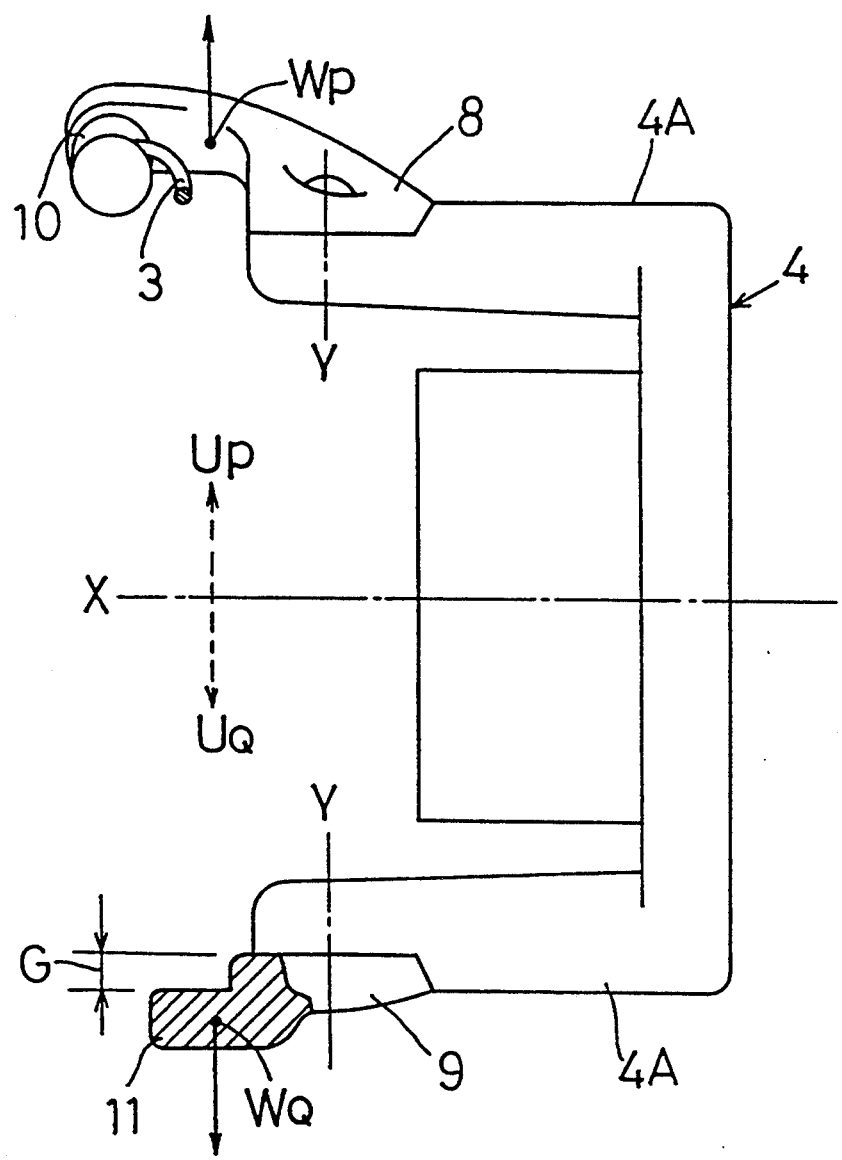
FIG. 1 is a schematic side view showing a balanced condition of a rotor of a spinning reel.
Figure 2:
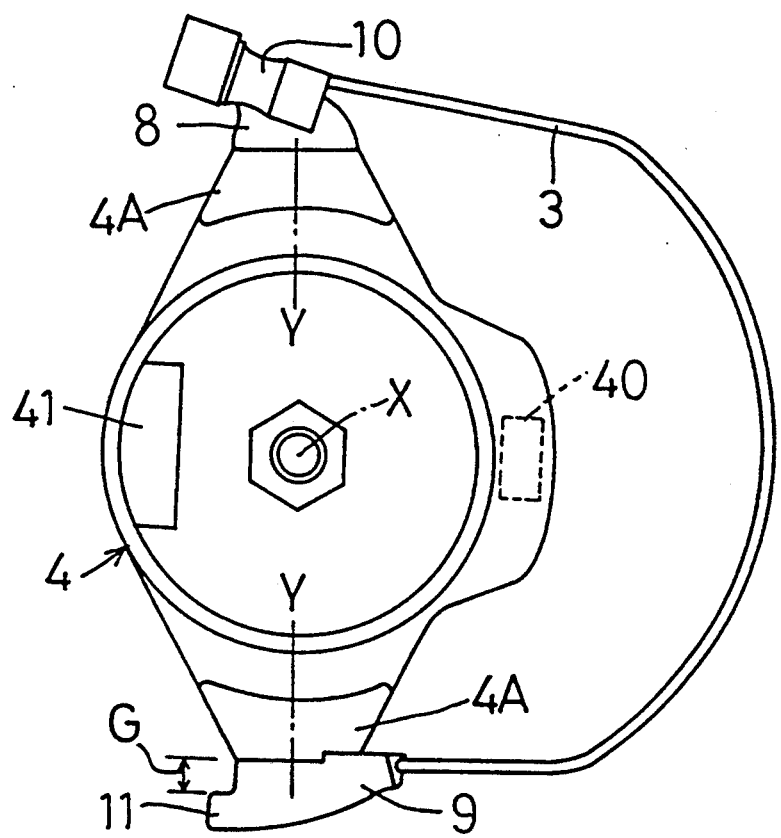
FIG. 2 is a front view of the rotor.
Figure 3:
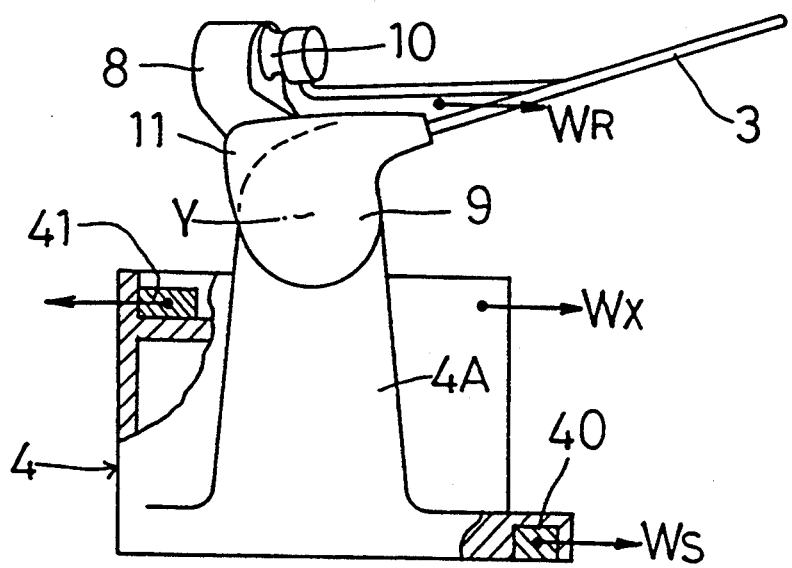
FIG. 3 is a side view of the rotor.

More specifically, as shown in FIGS. 1 through 3, the pivotable arm 9 is provided as a heavy component as being formed of die-cast zinc; and a balancer 11 is formed integrally with this pivotable arm 9. The balancer 11 is so located as to project on a side opposite to the bail and outwardly of the pivotable arm 9 with respect to a direction along the axis Y. Further, a gap G is formed for displacing this balancer 11 outwardly in the direction of the axis Y.

The above-described formation of the gap G is for preventing contact between the balancer 11 and the arm portions 4A of the rotor 4 during an operation of the bail 3.

Further, a composite gravity center WQ of the balancer 11 and the pivotable arm 9 is arranged at a position on a rotational path along which a gravity center WP of the arm cam 8 moves during rotation of the rotor 4 and in opposition to said gravity center WP of the arm cam 8. Moreover, the composite gravity center WQ is provided with such a weight as to offset a weight of the arm cam 8. As a result, moments of the gravity centers WP. WQ are balanced with each other. With the moments from the weights of the gravity centers WP, WQ being offset each other, there is produced no vibration even if the rotor 4 is rotated at a high speed, whereby a smooth line retrieving action is possible.

Incidentally, with the above-described reel, while the balancer 11 can offset the weight of the bail 3 to some extent, the balancer 11 can not completely offset this weight. For this reason, in addition to the balancer 11, a further balancing means is provided for solving imbalance due to the weight of the bail 3. Referring more particularly to this further balancing means, a main balancer 41 is provided at a position opposed across the axis X to a composite gravity center WX composed of a gravity center WS of an auxiliary balancer 40 located with displacement relative to the reel body 2 on the side of the retrieving position of the bail 3 with respect to the direction along the axis X and of a further gravity center WR due to the weight of the bail 3; and the main balancer 41 has such a weight as to offset the weight of the composite gravity center WX during the rotation of the rotor 4.

Further embodiments of the invention will be described next.

In addition to the foregoing embodiment, it is also conceivable to form the balancer 11 and the pivotable arm 9 as separate components, with the balancer 11 being attached to an outer side of this pivotable arm 9. Also, the balancer can be rendered position-adjustable.

In the foregoing embodiment, the balancers 40, 41 are provided for correcting the imbalance due to weight of the bail 3. An alternate construction is possible to be described next. That is, the pair of arm portions 4A, 4A will be provided to the rotor 4 with the arm portions 4A. 4A being offset towards the side opposite to the bail. Then, without using the balancers, it is possible to balance with each other the moment from the weight of the pair of arm portions 4A, 4A and from the weight of the balancer 11 with the further moment due to the weight of the bail 3.

A still further embodiment will be described next.

In the case of a reel of this further embodiment, as shown in FIGS. 7 through 10, the balancer 11 is accommodated within the pivotable arm 9. Further, the composite gravity center WQ of the balancer 11 and of the pivotable arm 9 is located at the position on the rotational path along which the gravity center WP moves during rotation of the rotor 4 and in opposition to the gravity center WP of the arm cam 8; and the composite gravity center WQ is provided with such a weight as to offset the weight of the gravity center WP of the arm cam 8.

Through the above-described arrangement of the balancer 11, the weights are balanced with each other it, the direction along the axis X. Further, the weights of the respective gravity centers WP, WQ are offset with each other. Accordingly, even if a mechanical looseness is developed in the support construction for the rotor 4, a smooth line retrieving action is possible without causing vibration during the rotation of the rotor 4.

Incidentally, in the case of the reel of this embodiment, in addition to the balancer 11, a further balancing means is provided for solving imbalance due to the weight of the bail 3. Referring more particularly to this further balancing means, the main balancer 41 is provided at the position opposed the axis X to the composite gravity center WX composed of the gravity center WS of the auxiliary balancer 40 located with displacement relative to the reel body 2 on the side of the retrieving position of the bail 3 with respect to the direction along the axis X and of the further gravity center WR due to the weight of the bail 3; and the main balancer 41 has such weight as to offset the weight of the composite gravity center WX during the rotation of the rotor 4.

In addition to the above-described embodiments, it is also conceivable to form the balancer 11 and the pivotable arm 9 integrally with each other, with forming the pivotable arm 9 of a heavy material. Further, the balancer 11 can be attached to an outer side of the pivotable arm 9. Also, the balancer 11 can be rendered position-adjustable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
   a reel body (2);
   a rotor (4) disposed at a forward position of the reel body (2);
   a pair of arm portions (4A, 4A) extending form said rotor (4), disposed on said rotor (4) substantially opposite to each other with respect to the axis of rotation (X) of said rotor (4);
   an arm cam (8) pivotably attached to one of said pair of arm portions (4A);
   a line roller (10) mounted on said arm cam (8);
   a pivotable arm (9) attached to the other of said arm portions (4A);
   a bail (3) interposed between said line roller (10) and the pivotable arm (9);
   said arm cam (8) and said pivotable arm (9) being pivotable about a pivot axis (Y) substantially normal to said axis of rotation (X);
   a balancer (11) provided to the pivotable arm (9), the balancer (11) having a configuration projecting from the pivotable arm (9) on a side of said pivot axis (Y) substantially opposite to the bail (3) and disposed outwardly on the pivotable arm (9) with respect to the axis of rotation (X), said balancer being formed integrally with said pivotable arm (9).

2. A spinning reel as defined in claim 1, further comprising an auxiliary balancer (40) and a main balancer (41), said auxiliary and main balancers being disposed on said rotor (4) so as to correct any torsional imbalance due to a weight of said bail (3) during rotation of said rotor (4).

3. A spinning reel comprising:
   a reel body (2);
   a rotor (4) disposed at a forward position of the reel body (2);
   a pair of arm portions (4A, 4A) extending from said rotor (4), disposed on said rotor (4) substantially opposite to each other with respect to the axis of rotation (X) of said rotor (4);
   an arm cam (8) pivotably attached to one of said pair of arm portions (4A);
   a line roller (10) mounted on said arm cam (8);
   a pivotable arm (9) attached to the other of said arm portions (4A);
   a bail (3) interposed between said line roller (10) and the pivotable arm (9);
   said arm cam (8) and said pivotable arm (9) being pivotable about a pivot axis (Y) substantially normal to said axis of rotation (X);
   a balancer (11) provided to the pivotable arm (9) and disposed such that said balancer (11) and said pivotable arm (9) create a composite gravity center (WQ) which follows a rotational path substantially coincident with the rotational path of a second composite gravity center (WP) created by said cam arm (8), the balancer (11) being weighted and disposed such that said first composite gravity center and said second composite gravity center are substantially offsetting, said balancer (11) being formed integrally with said pivotable arm (9).

4. A spinning reel as defined in claim 3, further comprising an auxiliary balancer (40) and a main balancer (41), said auxiliary and main balancers being disposed on said rotor (4) so as to correct any imbalance due to a weight of said bail (3) during rotation of said rotor (4).

* * * * *